United States Patent
Lee et al.

(10) Patent No.: US 11,953,334 B2
(45) Date of Patent: Apr. 9, 2024

(54) SYSTEM AND METHOD FOR VEHICLE ROUTING

(71) Applicant: Morgan State University, Baltimore, MD (US)

(72) Inventors: Young-Jae Lee, Timonium, MD (US); Amirreza Nickkar, Rosedale, MD (US)

(73) Assignee: Morgan State University, Baltimore, MD (US)

(*) Notice: Subject to any disclaimer, the term of this patent is extended or adjusted under 35 U.S.C. 154(b) by 518 days.

(21) Appl. No.: 17/017,084

(22) Filed: Sep. 10, 2020

(65) Prior Publication Data

US 2021/0072037 A1 Mar. 11, 2021

Related U.S. Application Data

(60) Provisional application No. 62/898,111, filed on Sep. 10, 2019.

(51) Int. Cl.
*G01C 21/34* (2006.01)
*G01C 21/36* (2006.01)
(Continued)

(52) U.S. Cl.
CPC ....... *G01C 21/3453* (2013.01); *G01C 21/362* (2013.01); *G06Q 10/047* (2013.01);
(Continued)

(58) Field of Classification Search
None
See application file for complete search history.

(56) References Cited

U.S. PATENT DOCUMENTS 10,268,987 B2 4/2019 Glaser
10,380,534 B2 8/2019 Khasis
(Continued)

OTHER PUBLICATIONS

Fricker, Jon D. "Circuity factor values in ridesharing: a detailed update." 1986. Transportation research record 1082: 34-40. (Year: 1986).*

(Continued)

*Primary Examiner* — Rachid Bendidi
*Assistant Examiner* — Selena M Jin
(74) *Attorney, Agent, or Firm* — Whiteford, Taylor & Preston, LLP; Gregory M. Stone; Lisa M. Schreihart (57) ABSTRACT

A system and method for automated routing of people and materials from one location to another based on automated vehicle technology are applied to bus transit, ridesharing and car sharing, and on multiple modes of delivery, including rail, water, road and air. An optimal transit algorithm uses Degree of Circuity (DOC) and Maximum Degree of Circuity (Max DOC) to refine transit network design and scheduling. Max DOC and computed shortest travel times are used to define the maximum acceptable travel time for each passenger or package. Using those maximum acceptable travel times for passengers and/or packages as constraints, optimal routings are developed for each primary transport hub, using a Simulated Annealing (SA) algorithm. The SA algorithm may be used as a basis for optimal flexible feeder bus routing, which considers relocation of buses for multiple primary transport hubs and multiple primary transport vehicles.

17 Claims, 7 Drawing Sheets

(51) Int. Cl.
  *G06Q 10/047* (2023.01)
  *G06Q 10/0631* (2023.01)
  *G06Q 50/30* (2012.01)

(52) U.S. Cl.
  CPC . *G06Q 10/06312* (2013.01); *G06Q 10/06315* (2013.01); *G06Q 50/30* (2013.01)

(56) References Cited

U.S. PATENT DOCUMENTS

| | | | |
|---|---|---|---|
| 10,405,215 | B2 | 9/2019 | Tavares Coutinho et al. |
| 2013/0024249 | A1* | 1/2013 | Zohar .................... G07B 15/02 |
| | | | 705/13 |
| 2016/0320194 | A1* | 11/2016 | Liu .................... G01C 21/3438 |
| 2018/0086353 | A1* | 3/2018 | Holbrooke .............. B61B 13/08 |

OTHER PUBLICATIONS

Young-Jae Lee and Amirreza Nickkar, "Optimal Automated Demand Responsive Feeder Transit Operation and Its Impact," Urban Mobility & Equity Center, Morgan State University (Sep. 2018).

* cited by examiner

FIG. 2

Step 0: *Initialization*:
    Set s=1,    Best Cost=*positive infinite*,    T=T$_0$,    alpha=0.99,    previous station help=0,    next station help=0,    vehicle (s; s: 1 to S) =4,    min vehicle(s; s: 1 to S) = 0
Step 1: *Clustering*:
    Define passenger's cluster
Step 2: *Create random solution*
    Considering the length of trip (number of passengers (s) +vehicles(s)-1)
        set x as a random solution
Step 3: *Find optimal solution*:
    IF It1<It1max, THEN
        go to step 4, otherwise go to step 6
        END IF
Step 4: IF It2< It2max, THEN
    go to *step 4.1*, otherwise go to step 5
        END IF
*Step 4.1*: Creating neighborhood:
    set x$_{new}$ = a neighborhood of x
*Step 4.2*: IF best cost for x< best cost for x$_{new}$, THEN
    set x=x$_{new}$ and go to *step 4.5*, otherwise go to *step 4.3*
        END IF
*Step 4.3*: p= exp-(cost x$_{new}$ -- cost x)/T*Cost x
*Step 4.4*: Accept x= x$_{new}$ by p -probability and reject- and x= x$_{new}$ by (1-p) and go to *step 4.5*
*Step 4.5*: Cost calculation for x$_{new}$
*Step 4.6*: IF best cost for x$_{new}$ > best cost, THEN
    set bestsol= x$_{new}$
        END IF
*Step 4.7*: IF x$_{new}$ is feasible (considering time ratio), and best cost for x$_{new}$ > feasible_best cost, THEN
    set feasible_bestsol= x$_{new}$
        END IF
*Step 4.8*: Reducing the temperature:
    set T = alpha*T$_0$ (0<alpha<1)
*Step 4.9*: set It2=It2+1 and go to step 4
Step 5: Set It1=It1+1 and go to step 3
Step 6: IF feasible_bestsol is empty, THEN
    min vehicle (s)= vehicle (s)+1 and go to step 7, otherwise go to step 14
        END IF
Step 7: Calculate the following proportion for stations s-1 and s+1: number of passengers (s)/vehicle(s)
Step 8: IF s-1 exists and vehicle (s-1)> min vehicle (s-1), THEN
    go to step 9, otherwise go to step 11
        END IF
Step 9: IF proportion for station s is ≤ the proportion for station s+1 or vehicle (s+1) ≤ min vehicle (s+1)
    go to step 10, otherwise go to step 11
        END IF
Step 10: Set previous station help (s)= previous station help (s)+1 and vehicle (s-1)=vehicle (s-1)-1, s=s-1, and go to step 2
Step 11: IF s+1 exists and vehicle (s+1)> min vehicle (s+1) THEN
    go to step 12, otherwise go to step 13
        END IF
Step 12: Set next station help (s)= next station help(s)+1 and vehicle (s+1)=vehicle (s+1)-1 and go to step 2
Step 13: Show "The problem is not feasible; more vehicles is needed"
Step 14: IF s<S, THEN
    set s=s+1 and go to step 2, otherwise go to step 15
        END IF
Step 15: *Show results*
Step 16: END

SYSTEM AND METHOD FOR VEHICLE ROUTING

CROSS REFERENCE TO RELATED APPLICATIONS

This application is based upon and claims the benefit of U.S. Provisional Application No. 62/898,111 titled "Optimal Automated Demand Responsive Feeder Transit Operation Method," filed with the United States Patent & Trademark Office on Sep. 10, 2019, the specification of which is incorporated herein by reference in its entirety.

GOVERNMENT LICENSE RIGHTS

Portions of the invention described herein were made with government support under Contract No. 69A43551747123 awarded by the U.S. Department of Transportation. The U.S. government may have certain rights in the invention.

FIELD OF THE INVENTION

This invention is directed to automated systems and methods for optimal routing of vehicles for transporting transport items (such as human passengers, packages, parcels, and the like), and more particularly to an automated system and method for the routing of vehicles in a transportation system comprising multiple modes of transportation that uses a maximum acceptable travel time for the transport items as a constraint in determining an optimal travel route.

BACKGROUND OF THE INVENTION

As metropolitan areas and their associated populations increase across the globe, so does interest in managing the increased traffic congestion and the negative effects that such increased traffic may have on the environment and the general well-being of the residents of that metro area. Transit network design is often implemented to best manage such growing traffic demand, and includes varied public transportation elements, including for example large transportation service providers such as airlines, trains, and large commercial busing companies that move passengers to large, central transport hubs (such as an airport, a train station, a bus station, or the like), and smaller transportation service providers that may move passengers between such central transport hubs and either or both of their starting or final destinations (or optionally some intermediate destination). Similar models are used for the transport of packages and parcels, in which such packages and parcels may be transported to a central transportation hub, and then moved from such central transportation hub to their final delivery destination (or an intermediate destination). Transit network design is the most fundamental foundation of transit planning and operation because it dictates the operational efficiency, passenger or package/parcel travel time, passenger attraction and revenue. Moreover, the continued expansion of autonomous and connected vehicles (CVs) is changing the paradigm for transportation users and industries, as well as for public transportation (including mass transit, ridesharing, and car sharing). Transit networks with autonomous and connected vehicles offer opportunities for more efficient movement of passengers and vehicles. For example, in the case of feeder bus networks that move passengers between their start location or final destination and a central transport hub, small-sized flexible door-to-door feeder bus operation will become more easily implemented, thanks to technological advances and business innovations by transportation network companies.

Efforts have been made to improve the modeling and generation of feeder-bus route designs, including efforts directed to solving the feeder-bus network design problem (FBNDP) and a heuristic feeder route generation algorithm (HFRGA), and various studies have explored methods based on heuristics and metaheuristics-related algorithms. Likewise, various efforts have been made to exploit smart vehicle technologies.

For example, U.S. Pat. No. 10,268,987 to Glaser discloses a system and method for managing passenger transportation requests that uses smart vehicle technology to time the pickup of a passenger from a vehicle segment based on the travel progress of the passenger on that vehicle segment.

Further, U.S. Pat. No. 10,380,534 to Khasi s discloses a system and method for an autonomous supply and distribution chain management network, in which multiple modes of transportation are used to deliver orders to customers, which allows for the dynamic modification of transit operations to alter one or more destinations of the inventory while it is in transit to a new location.

Still further, U.S. Pat. No. 10,405,215 to Tavares Coutinho et al. discloses an autonomous vehicle network architecture for operating self-organized fleets of autonomous vehicles.

The specifications of each of the foregoing are incorporated herein by reference in their entireties.

Notwithstanding the foregoing efforts, there remains a need in the art for providing automated systems and methods capable of establishing more cost- and time-efficient routing of vehicles to move transport items, such as passengers and packages or parcels, between their start or final destinations and central transportation hubs (and/or intermediate destinations), that will provide sufficient convenience to the transportation network users and customers to induce them to use those vehicles and reduce overall traffic network congestion.

SUMMARY OF THE INVENTION

Disclosed is a system and method for the automated routing of people and materials from one location to another based on automated vehicle technology as it applies to bus transit, ridesharing and car sharing, and on multiple modes of delivery including rail, water, road and air. As described in Young-Jae Lee and Amirreza Nickkar, "Optimal Automated Demand Responsive Feeder Transit Operation and Its Impact," Urban Mobility & Equity Center, Morgan State University (September 2018), which report is incorporated herein by reference in its entirety, and as discussed in detail below, an optimal transit algorithm is employed that uses Degree of Circuity (DOC) and Maximum Degree of Circuity (Max DOC) to better refine transit network design and scheduling. The given Max DOC and computed shortest travel times are used to define the maximum acceptable travel time for each passenger or package (i.e., "transport item" as used herein). Using those maximum acceptable travel times for passengers and/or packages as constraints, optimal routings are developed for each primary transportation hub, such as a train station, using the Simulated Annealing (SA) algorithm. The SA algorithm may be used as a basis for optimal flexible feeder bus routing, which considers relocation of buses for multiple primary transportation hubs, such as multiple train stations, and multiple primary transport vehicles, such as multiple trains at each such station.

The objective function of the automated system and method configured in accordance with certain aspects of the invention seeks the minimization of the total costs associated with the transport, including the passengers' travel costs and the operating costs. In certain exemplary configurations, the system and method may be used to reroute and/or relocate feeder buses when an optimal bus routing is not feasible with the currently available buses at certain stations in a multi-station transit network. Such system and method limits the Maximum DOC for each passenger while minimizing the total cost, including the total vehicle operating costs and the total passenger in-vehicle travel time costs. Unlike fixed route mass transit, small vehicle demand responsive service uses flexible routing, which means lower unit operating costs not only decrease total operating costs and total costs, but also can affect routing and impact network characteristics. Optimal flexible demand responsive feeder transit networks may be generated with various unit transit operating costs using the automated system and method described herein.

In accordance with certain aspects of an embodiment of the invention, an automated method for routing transport vehicles from and to a plurality of primary transportation hubs is provided, comprising: receiving at a processor of a routing system computer data from a plurality of intended transport vehicle passengers indicative of a current location and an intended destination of each intended transport vehicle passenger; designating at the processor a maximum degree of route circuitry for each intended transport vehicle passenger and calculating a maximum travel time for each intended transport vehicle passenger based on the maximum degree of route circuitry; determining at the processor an optimal travel routing for a plurality of transport vehicles to transport each intended transport vehicle passenger between one of the plurality of primary transportation hubs and a final destination or starting point for each intended transport vehicle passenger, and using the maximum travel time for each intended transport vehicle passenger as a constraint for determining the optimal travel routing; and transmitting from the routing system computer a routing signal to each transport vehicle instructing each transport vehicle to travel along a determined optimal travel routing for each transport vehicle.

In accordance with further aspects of an embodiment of the invention, a system for the automated routing of transport vehicles from and to a plurality of primary transportation hubs is provided, the system comprising a memory and a processor in data communication with the memory, the memory having computer executable instructions stored thereon configured to be executed by the processor to cause the system to: receive data from a plurality of intended transport vehicle passengers indicative of a current location and an intended destination of each intended transport vehicle passenger; designate a maximum degree of route circuitry for each intended transport vehicle passenger and calculate a maximum travel time for each intended transport vehicle passenger based on the maximum degree of route circuitry; determine an optimal travel routing for a plurality of transport vehicles to transport each intended transport vehicle passenger between one of the plurality of primary transportation hubs and a final destination or starting point for each intended transport vehicle passenger, and using the maximum travel time for each intended transport vehicle passenger as a constraint for determining the optimal travel routing; and transmit a routing signal to each transport vehicle instructing each transport vehicle to travel along a determined optimal travel routing for each transport vehicle.

In accordance with still further aspects of an embodiment of the invention, a non-transitory computer-readable medium is provided, having stored thereon one or more code sections each comprising a plurality of instructions executable by one or more processors, the instructions configured to cause the one or more processors to perform the actions of an automated method for routing transport vehicles from and to a plurality of primary transportation hubs, the actions of the method comprising the steps of: receiving data from a plurality of intended transport vehicle passengers indicative of a current location and an intended destination of each intended transport vehicle passenger; designating a maximum degree of route circuitry for each intended transport vehicle passenger and calculating a maximum travel time for each intended transport vehicle passenger based on the maximum degree of route circuitry; determining an optimal travel routing for a plurality of transport vehicles to transport each intended transport vehicle passenger between one of the plurality of primary transportation hubs and a final destination or starting point for each intended transport vehicle passenger, and using the maximum travel time for each intended transport vehicle passenger as a constraint for determining the optimal travel routing; and transmitting a routing signal to each transport vehicle instructing each transport vehicle to travel along a determined optimal travel routing for each transport vehicle.

Still other aspects, features and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The numerous advantages of the present invention may be better understood by those skilled in the art by reference to the accompanying drawings in which:

FIG. 3 is a listing of exemplary software instructions suitable for implementing methods for vehicle routing in accordance with certain aspects of an embodiment of the invention.

DETAILED DESCRIPTION

The invention summarized above may be better understood by referring to the following description, claims, and accompanying drawings. This description of an embodiment, set out below to enable one to practice an implementation of the invention, is not intended to limit the preferred embodiment, but to serve as a particular example thereof. Those skilled in the art should appreciate that they may readily use the conception and specific embodiments disclosed as a basis for modifying or designing other methods and systems for carrying out the same purposes of the present invention. Those skilled in the art should also realize that such equivalent assemblies do not depart from the spirit and scope of the invention in its broadest form.

Descriptions of well-known functions and structures are omitted to enhance clarity and conciseness. The terminology used herein is for the purpose of describing particular embodiments only and is not intended to be limiting of the present disclosure. As used herein, the singular forms "a", "an" and "the" are intended to include the plural forms as well, unless the context clearly indicates otherwise. Furthermore, the use of the terms a, an, etc. does not denote a limitation of quantity, but rather denotes the presence of at least one of the referenced items.

The use of the terms "first", "second", and the like does not imply any particular order, but they are included to identify individual elements. Moreover, the use of the terms first, second, etc. does not denote any order of importance, but rather the terms first, second, etc. are used to distinguish one element from another. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Although some features may be described with respect to individual exemplary embodiments, aspects need not be limited thereto such that features from one or more exemplary embodiments may be combinable with other features from one or more exemplary embodiments.

Figure 1:
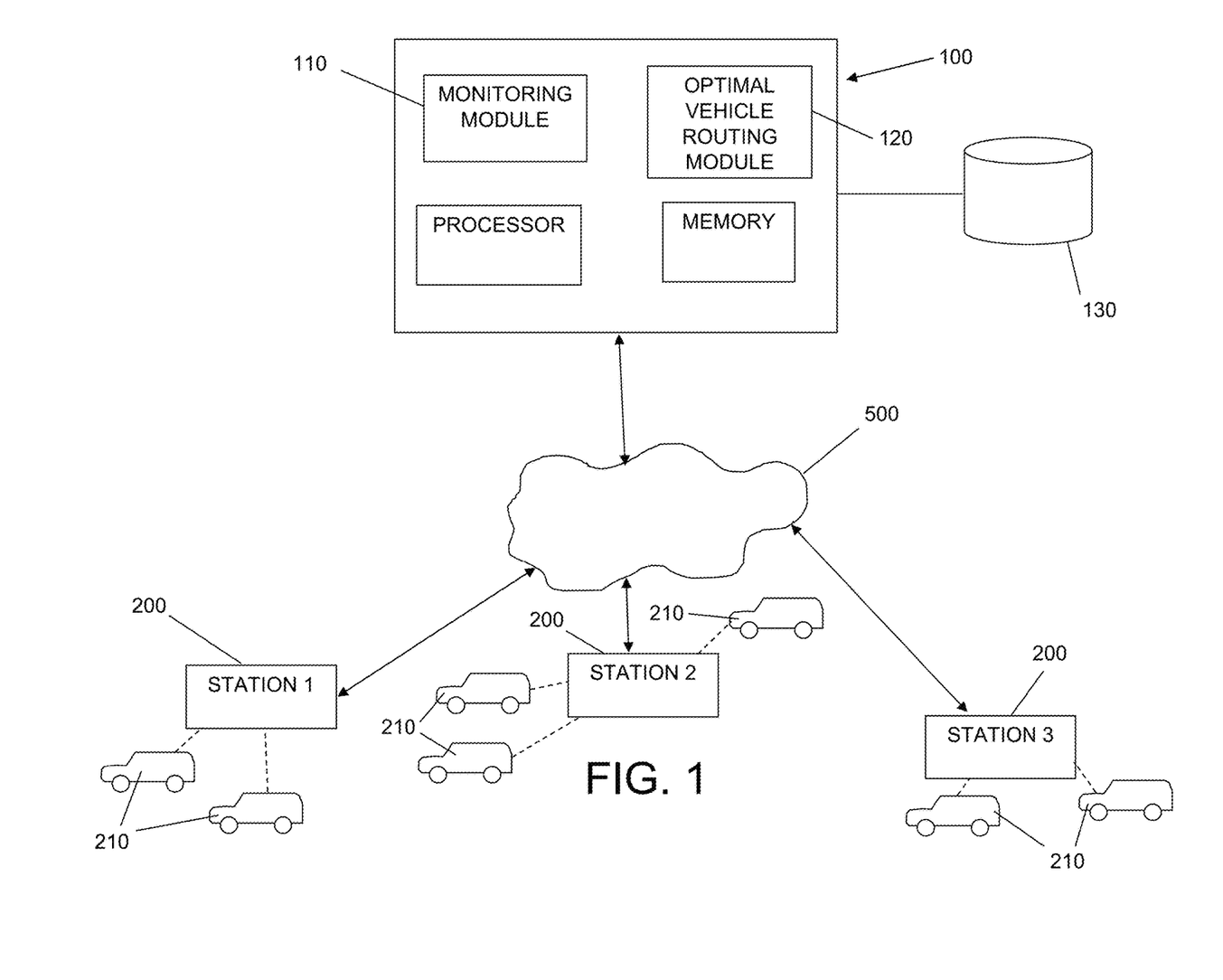
FIG. 1 is a schematic view of a system for vehicle routing according to certain aspects of an embodiment of the invention.

In accordance with certain aspects of an embodiment of the invention, FIG. 1 shows a schematic view of an exemplary system for vehicle routing. A routing computer 100 is provided and includes a monitoring module 110 configured to monitor the locations of transport vehicles, such as feeder vehicles in a transit network that are used to transport individual passengers between a trip start location or a final destination (or an intermediate destination) and a central transportation hub, such as a train station. Monitoring module 110 is further configured to monitor the locations of individual passengers, including the location of such passengers' trip start location or final destination, such that the automated routing method described herein may be used to route those passengers between their trip start location or final destination and the central transportation hub. Routing computer 100 also includes an optimal vehicle routing module 120 configured to establish an optimal travel routing for each transport vehicle (employing the methods set forth in detail below), such as a feeder bus or the like, that services a given central transportation hub for moving passengers between their start or final destination and its respective central transportation hub. Still further, routing computer 100 includes a data storage device 130 which may include data necessary for the automated routing method to perform the functions described below. Such data may include, by way of non-limiting example, passenger profiles that include data indicating their start location or final destination (along with traditional identifying and payment information), primary transport vehicle (e.g., plane, train, etc.) schedules that service the primary transportation hubs 200 serviced by routing computer 100, and transport vehicle profiles that identify which transport vehicles 210 (e.g., feeder buses) are assigned to which primary transportation hubs 200 for moving passengers between their start or end trip locations and their intended primary transportation hub 200.

Routing computer 100 preferably communicates with primary transportation hubs 200, transport vehicles 210, and preferably passengers (e.g., through location based services on passengers' mobile computing and communications device, such as a mobile telephone) via a wide area network 500, such as the Internet, through a wireless telephone communication medium, or such other remote communication medium as will readily occur to those skilled in the art.

The method employed by optimal vehicle routing module 120 for moving passengers between their start or end location and their respective primary transportation hub may be particularly configured for automated, demand-responsive feeder transit services. Such method minimizes total costs, including vehicle operating costs and passenger travel time, while individual passengers' maximum travel times are limited within given maximum travel times. Employing individual passengers' maximum travel times as a constraint in generating an optimal transport vehicle route is a key aspect of the automated routing methods disclosed herein and varies from previously known delivery-pickup methods, which typically do not consider individual passengers' or packages' travel times. Further, the methods employed by optimal vehicle routing module 120 enable relocation of transport vehicles, such as feeder buses, between varied primary transportation hubs, thus enabling exploitation and sharing of resources in transit networks comprised of multiple primary transportation hubs, each servicing multiple primary transport vehicles.

An initial step of such method is the clustering of passengers (where it is assumed that all passengers are assigned to certain primary transportation hubs, such as train stations in the defined transit network). A random series of integers is created for establishing the initial solution (random permutation of integers from 1 to the number of passengers of the related station plus the number of feeder buses minus one). The method allocates feeder buses to passengers depending on the location of greater integers in the generated permutation, and then, based on the order of integers in the generated permutation, the routes of transport vehicles are determined. For example, in the presence of 2 vehicles and 10 passengers, a permutation of integers from 1 to 11 is produced. A generated permutation may be as follows: Path=[10, 1, 3, 4, 8, 2, 9, 5, 7, 6]. In this case, the route of the first transport vehicle would be generated by serving passengers 10, 1, 3, 4, 8, respectively, and the second transport vehicle route is made by serving passengers 2, 9, 5, 7, 6, respectively. In each iteration, the SA algorithm attempts to improve the solution by searching its neighborhoods of possible solutions. For this purpose, well known common swap, insertion, and reversion methods may be used. The generated solution in the neighborhood of the current solution is then compared to the current solution, and based on the SA algorithm, it is accepted or rejected. That comparison is based on the value of a hypothesized objective function, which includes penalties for modeling constraints (discussed in detail below). The SA algorithm attempts to reduce the value of an objective cost function calculated as follows:

$$Z' = C_O \times \text{Total vehicles travelled distance} + C_T \times \text{Total passengers in vehicle travel time}$$

where $C_O$ is the unit operating cost of each vehicle kilometer, and $C_T$ is the time value of each passenger per hour. Finally, the best feasible solution found during the total iterations is presented as the final solution proposed by the SA algorithm.

Optionally, the objective function Z' described above may be further refined to account for those scenarios in which all passengers desiring transport in a given time window are unable to be serviced by the current arrangement of transport vehicles. In these cases, the constraints may be relaxed to allow, for example, certain passengers to stand instead of sitting in the transport vehicle (and thus exceed the designated number of passengers for that transport vehicle), to be picked up and transported later than the designated time window, and the like. Further in this case, the following objective cost function Z may be employed and minimized in order to find the final solution:

$$Z = Z' \times (1 + 0.5 \times \text{number of passengers not served in time window} + 5 \times \text{max number of passengers in excess of feeder bus capacity})$$

If the algorithm fails to find a feasible solution for a particular primary transport hub or station (e.g., there is no solution that enables the transport vehicles to transport all transport items/passengers to their intended destinations without violating the constraints), relocations of vehicles from other stations is considered. In this case, the proportion of the number of passengers to the number of feeder buses or other transport vehicles for the adjacent stations is computed, and the algorithm chooses the station with the lower proportion to compensate for the deficiency.

In order to consider individual passengers' acceptable travel times and acceptable circuitry of the routing, Degree of Circuity (DOC) and Maximum Degree of Circuity (Max DOC) are provided by the system administrator (such as a transit authority), and may establish each passenger's maximum actual travel time as a constraint, as follows:

$$\text{Degree of Circuity } (DOC) \geq \frac{(\text{Actual travel time})i}{(\text{Shortest travel time})i}$$

Maximum Degree of Circuitry (Max $DOC$) ≥

$$\max \left[ \frac{(\text{Actual travel time})i}{(\text{Shortest travel time})i} \right]$$

$i$ = Individual passenger

Transport vehicles, such as feeder buses, at each primary transportation hub or station will serve the passengers who use that particular station. For each such station in the subject transit network, and for each primary transportation vehicle for each station (e.g., each train at a train station), the optimal number of transport vehicles for servicing the passengers at each station is calculated and compared to the number of available transport vehicles. If more transport vehicles are available than are needed, then the surplus may be calculated, and the bus operation is considered feasible. If the needed number of transport vehicles are more than the number of available transport vehicles, then the deficiency is calculated, and the method evaluates whether there are surplus transport vehicles at adjacent stations in the transit network that are available for relocation. If the total number of available transport vehicles at all primary transport hubs in the transit network is more than the needed number of transport vehicles at all stations, then the service may be made feasible using multiple relocations of transport vehicles among the multiple stations.

Figure 2:
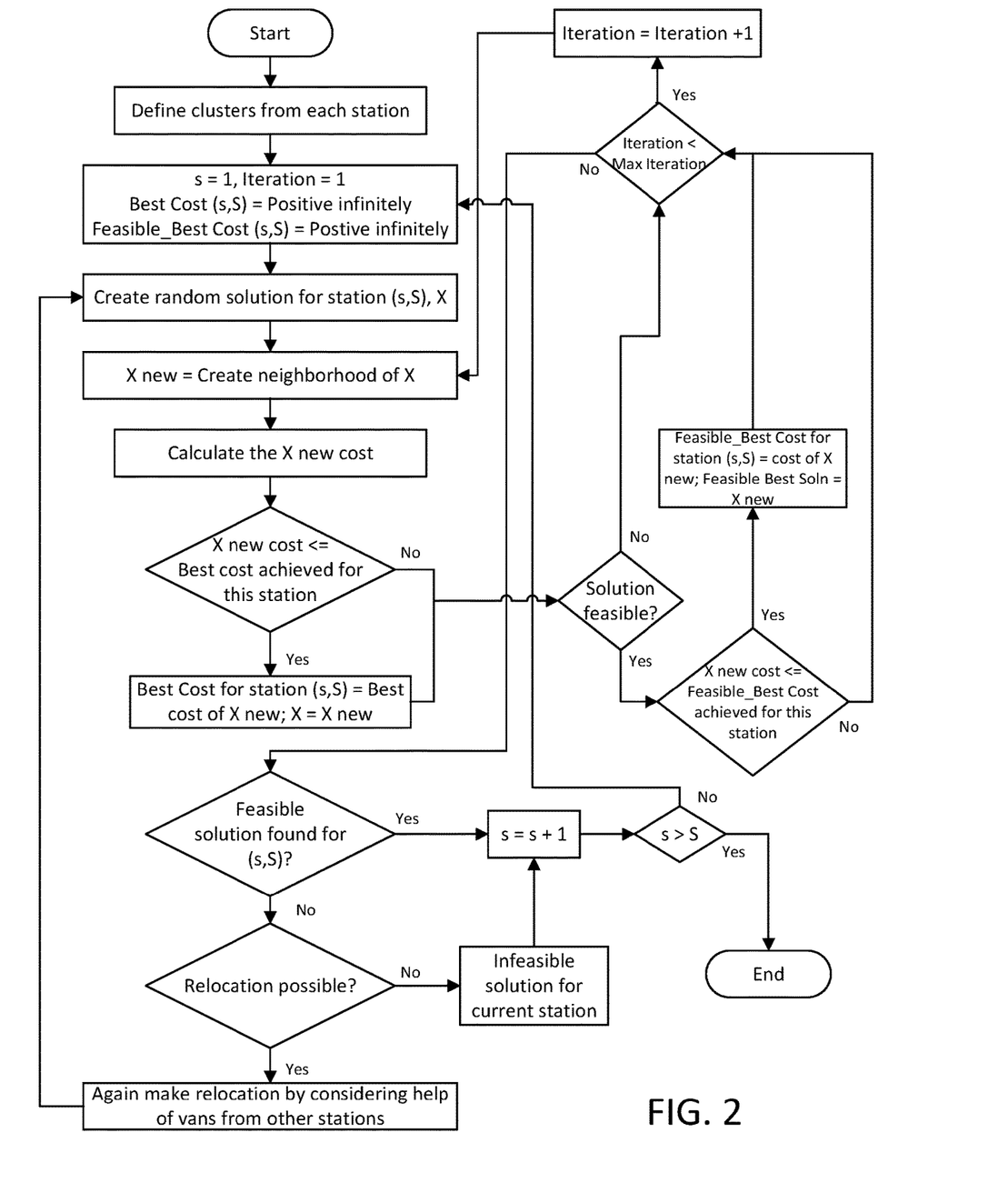
FIG. 2 is a flowchart showing a method for vehicle routing according to certain aspects of an embodiment of the invention.

FIG. 2 is a flowchart showing a method for routing and relocating transport vehicles among multiple stations of the subject transit network. In the method depicted in FIG. 2, the relocated transport vehicles first serve alighting passengers at the station to deliver them to their destinations, and then pick up passengers to take to the goal station to minimize costs. In FIG. 2, "s" is the index for stations and S is the index of the last station in the subject transit network.

As mentioned above, the routing problem may be solved using the SA algorithm which uses a probabilistic acceptance strategy, which includes many iteration stages to find the global optimum by a temperature-changing schedule. The SA algorithm may be particularly beneficial in methods according to aspects of the invention because it may easily escape from local minima and jump into the solution space to find a global optimum solution, because the SA can accept even worse answers with a specific probability. FIG. 3 provides a listing of exemplary software instructions suitable for implementing the SA algorithm as applied to solve the model of the optimal transport vehicle route. Likewise, the following is a mathematical formulation for solving such model. The objective function of the model is minimization of the total costs including passengers' travel costs and operating costs.

Following are the variables employed in the mathematical formulation:

$v_k = \begin{cases} 1 & \text{vehicle } k \text{ is used} \\ 0 & \text{otherwise} \end{cases}$ $y_{ik} = \begin{cases} 1 & \text{passenger } i \text{ is served with vehicle } k \\ 0 & \text{otherwise} \end{cases}$ $\alpha_{ijk} = \begin{cases} 1 & \text{passenger } j \text{ is served after passenger } i \text{ with vehicle } k \\ 0 & \text{otherwise} \end{cases}$ $r_i = \begin{cases} 1 & \text{passenger } i \text{ starts trip from train station (boarding)} \\ 0 & \text{passenger } i \text{ ends trip at train station (alighting)} \end{cases}$ $D_{ik}$ = distance travelled up to passenger $i$ by vehicle $k$ $TotalD_k$ = total distance travelled by vehicle $k$ $AT_i$ = Vehicle arrival time to passenger $i$ node $WT_i$ = In vehicle travel time of passenger $i$ $UC_i$ = Used capacity of vehicle after serving passenger $i$ $IC_i$ = number of passengers get on at train station on vehicle $k$ The objective function may be defined as $$z = \min \sum_{i=1}^{I} C_T * WT_i + \sum_{k=1}^{K} C_O * TotalD_k$$

Further, the following constraints may be employed:
Each passenger is served by exactly one transport vehicle:

$$\sum_{k=1}^{K} y_{ik} = 1 \quad i = 1.2. \ldots .I$$

If a passenger is assigned to a vehicle, that vehicle is considered to be a used vehicle:

$$\sum_{i=1}^{I} y_{ik} \leq M * v_k \quad k = 1.2. \ldots .K$$

The total number of used vehicles may not exceed the total number of available vehicles:

$$\sum_{k=1}^{K} v_k \leq \text{Available vehicles number}$$

Each path belongs to a single vehicle:

$$2 * \alpha_{ijk} \leq (y_{ik} + y_{jk}) i, j = 1, 2, \ldots, I; i \neq j, k = 1, 2, \ldots, K$$

Each passenger is assigned to a path:

$$\sum_{k=1}^{K}\sum_{j=1}^{I} \alpha_{ijk} + \sum_{k=1}^{K} \alpha_{i0k} \geq 1 \quad i = 1.2. \ldots .I$$

$$\sum_{k=1}^{K}\sum_{j=1}^{I} \alpha_{ijk} + \sum_{k=1}^{K} \alpha_{0jk} \geq 1 \quad j = 1.2. \ldots .I$$

The following defines the arrival time of vehicles to passengers:

$$D_{jk} \geq D_{ik} - M(1 - \alpha_{ijk}) + d_{ij} \quad i, j = 1.2. \ldots .I; i \neq j. \ k = 1.2 \ldots .K$$

$$D_{ik} \geq d_{i0} y_{ik} \quad i = 1.2. \ldots .I \ k = 1.2 \ldots .K$$

$$AT_i = \sum_{k=1}^{K} \frac{D_{ik}}{\text{speed}} \quad i = 1.2. \ldots .I$$

The waiting time for passengers is calculated as:

$$WT_i = ri \ AT_i + (1 - r_i)\left(\frac{TotalD_k}{\text{speed}} - AT_i\right) i = 1.2. \ldots .I$$

The following provides a time ratio constraint:

$$AT_i \leq DOC * \frac{d_{i0}}{\text{speed}} \quad i = 1.2. \ldots .I$$

The following provides the cycle time constraint:

$$AT_i + \frac{d_{i0}}{\text{speed}} \leq \text{cycle time} \quad i = 1.2. \ldots .I$$

The following establish capacity constraints:

$$UC_i = \sum_{k=1}^{K} IC_k y_{ik} + \sum_{k=1}^{K}\sum_{j=1}^{I} r_i \alpha_{jik} - \sum_{k=1}^{K}\sum_{j=1}^{I}(1 - r_i)\alpha_{jik}$$

$$IC_k = \sum_{j=1}^{I} y_{ik} r_i \quad k = 1.2. \ldots .K$$

$$UC_i \leq C \quad i = 1.2. \ldots .I$$

The following ensure that each route starts and ends at a station/primary transport hub:

$$TotalD_k \geq \sum_{k=1}^{K}(D_{ik} + d_{i0} y_{ik}) \quad i = 1.2. \ldots .I$$

$$\sum_{j=1}^{I} \alpha_{0jk} = v_k \quad k = 1.2 \ldots .K$$

$$\sum_{i=1}^{I} \alpha_{i0k} = v_k \quad k = 1.2 \ldots .K$$

$r_i = (0.1), v_k = (0.1), \alpha_{ijk} = (0.1), y_{ik} = (0.1)$ $D_{ik} \geq 0. \ TotalD_k \geq 0. \ AT_i \geq 0. \ WT_i \geq 0. \ UC_i \geq 0. \ IC_i \geq 0$ In the foregoing, the variables are defined as follows:
I: number of passengers
K: number of available vehicles
$d_{ij}$: direct distance between passengers i and j
$d_{i0}$: direct distance between passenger i and station
$C_T$: time value of passenger per hour
$C_O$: unit operating cost of vehicle per kilometer
Speed: vehicles speed
DOC: Degree of Circuity
Cycle time=20 minutes
C=capacity of vehicles
M: a large enough number used for modelling the expression Once the optimal routing has been calculated, such routing may be transmitted to the transport vehicles by any available data or message transport medium, either by way of a human-readable message or instruction to a human driver of each transport vehicle, or to an automated vehicle system on board an automated transport vehicle, to in turn be executed by the transport vehicle to adjust its travel route to the calculated optimal route. The methods described herein may be further implemented, by way of non-limiting example, in an IoS or ANDROID application on a user's mobile device (such as a cellular smartphone, a tablet, or other portable computing and communications device), which application may be used by consumers or others to advise on the fastest versus least expense modes of transportation.

Figure 4:
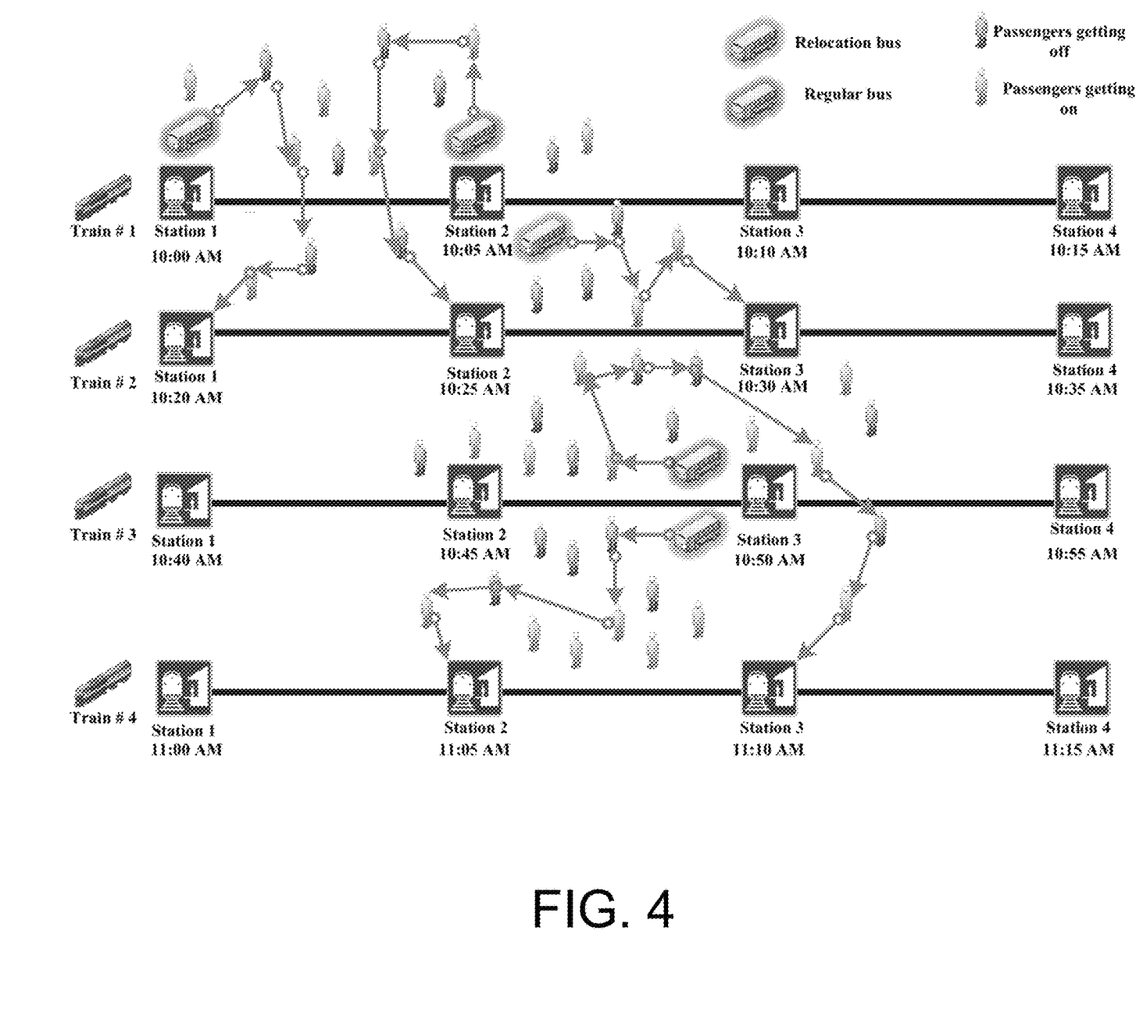
FIG. 4 is hypothetical rail transit line having four stations on which a method for routing transport vehicles according to certain aspects of an embodiment of the invention was studied.

An exemplary, hypothetical rail transit line having four stations was developed to test the foregoing method and to demonstrate is efficiency. FIG. 4 is a schematic view of such an exemplary system, and it illustrates a testing scenario using four trains and the relocation of feeder buses among the stations. In this example, the headway of the train is assumed to be 20 minutes and the travel time between two stations is assumed to be two minutes. The capacity for each feeder bus is assumed to be eight passengers. We also waived passengers' boarding and alighting time at the nodes and the stations. Table 1 shows the number of boarding and alighting (B/L) passengers for each station and each train.

TABLE 1

Passenger information for each station and each train.

| Train | Station 1 | | Station 2 | | Station 3 | | Station 4 | | Average total direct travel distance (Km) |
|---|---|---|---|---|---|---|---|---|---|
| | Boarding/ Alighting passengers (prs) | Average direct travel distance (Km) | Boarding/ Alighting passengers (prs) | Average direct travel distance (Km) | Boarding/ Alighting passengers (prs) | Average direct travel distance (Km) | Boarding/ Alighting passengers (prs) | Average direct travel distance (Km) | |
| Train 1 | 16 + 24 | 2.08 | 21 + 19 | 2.33 | 19 + 21 | 2.23 | 25 + 15 | 2.08 | 2.18 |
| Train 2 | 8 + 12 | 2.37 | 24 + 36 | 2.49 | 26 + 24 | 2.35 | 16 + 14 | 2.20 | 2.38 |
| Train 3 | 16 + 29 | 2.37 | 12 + 13 | 2.15 | 26 + 29 | 2.37 | 15 + 20 | 2.26 | 2.31 |
| Train 4 | 19 + 21 | 2.34 | 23 + 17 | 2.24 | 21 + 19 | 2.36 | 20 + 20 | 2.39 | 2.33 |
| | Average passenger total distance travel distance (Km) | | | | | | | | 2.30 |

Figure 5:
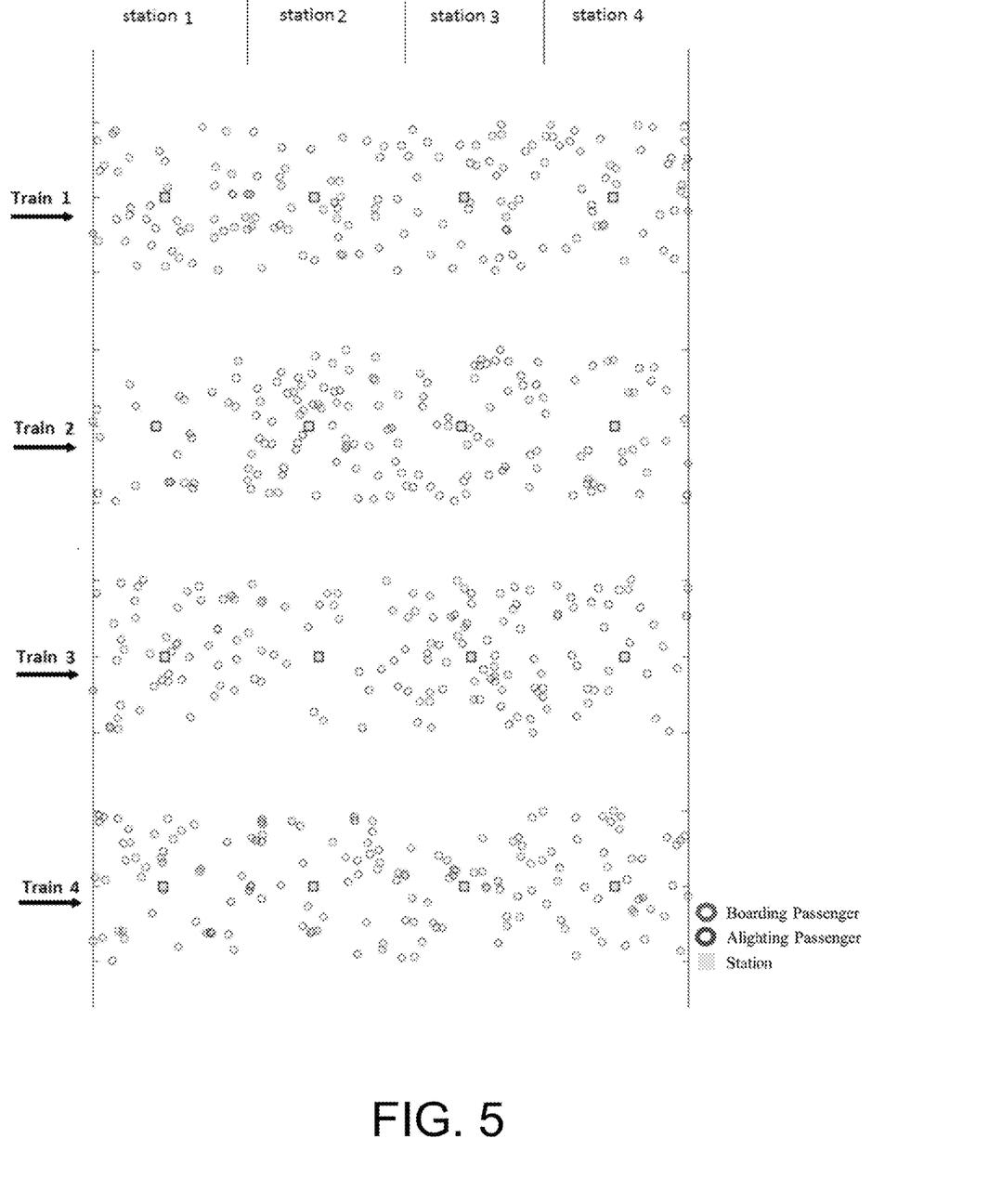
FIG. 5 shows boarding and alighting passengers around the four stations for the four trains depicted in FIG. 4.

For example, in Station 1 and for Train 1, 16 passengers need to be picked up and get on, and 24 passengers get off and need to be at Station 1 for Train 1. We also assumed that the average speed for feeder buses is 30 km/h and for trains is 60 km/h, and the distance between stations is 2 km. The travel time monetary value for each passenger has been placed at $20 per hour, and $0.3 per kilometers for vehicles is used as the operating cost. The origins and the destinations of the boarding and alighting passengers are randomly generated around the rail line for four trains. FIG. 5 shows the boarding (blue points) and alighting passengers (red points) around the four stations for the four trains (yellow points).

As explained above, the method beings with the initializing of inputs and clustering of the passengers. The inputs are: passengers demand coordination 20 minutes before train arrival (i.e., the default distribution of passengers in the network at this time), vehicle speed, trains' schedules, stations' coordination (i.e., the order of travel of trains to the varied stations), and velocity of trains. In the next step, the SA algorithm finds the optimal solution as detailed above. It is important in the SA algorithm applied in accordance with aspects of the invention that the cost calculation process includes three parameters: without help (i.e., without use of surplus transport vehicles from another station), with help from the previous station, and with help from the next station. Finally, the outputs comprise passenger's travel times, vehicles traveled distance, assigned buses in each station in each time window, relocated buses, and routes. As noted above, particularly the calculated optimal routes may then be transmitted to the designated transport vehicles, and there implemented by each respective transport vehicle to move passengers to their intended destinations.

Figure 6:
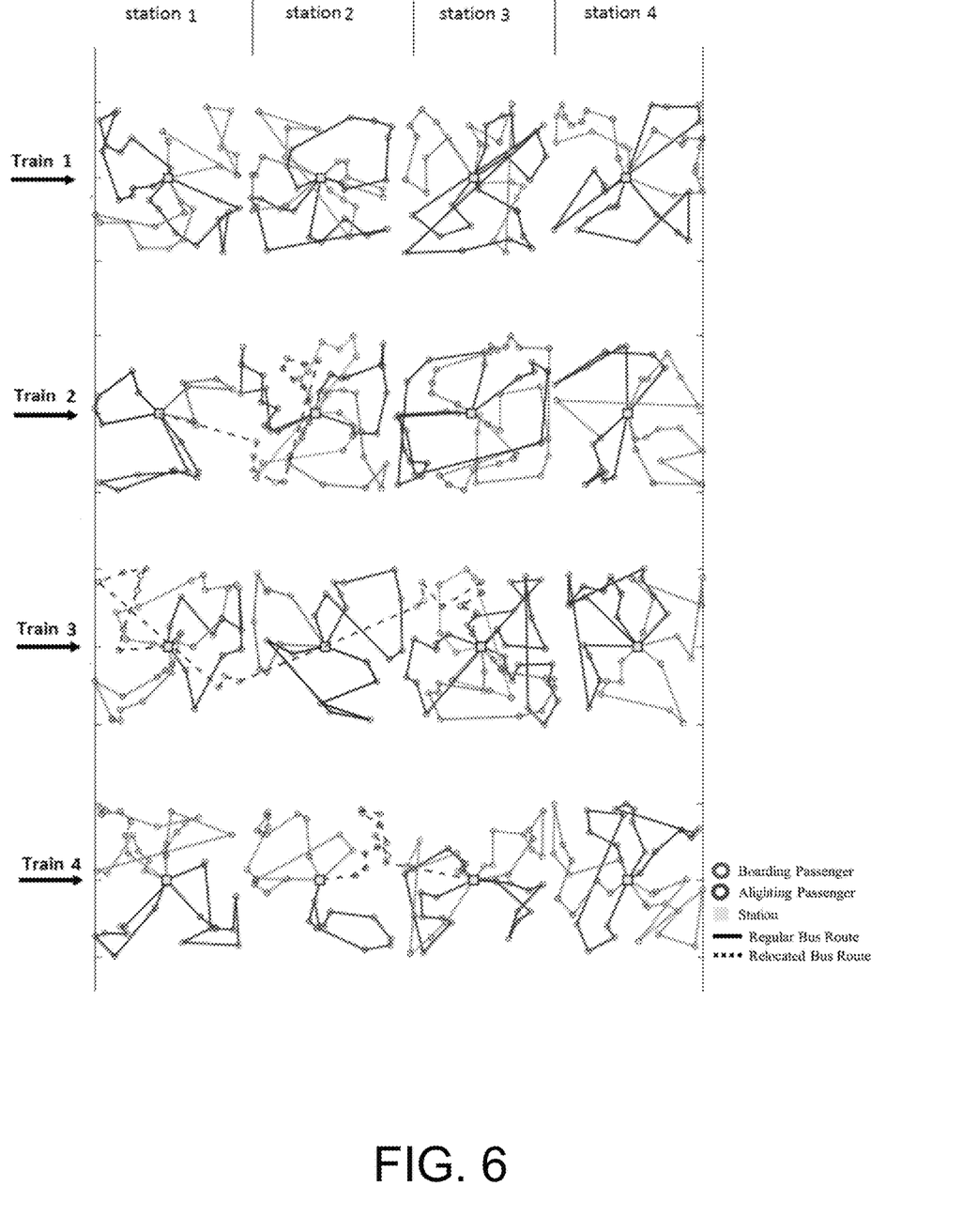
FIG. 6 is a schematic representation of calculated optimal routes for transport vehicles used in the hypothetical rail transit line of FIGS. 4 and 5.

FIG. 6 shows the results of the feeder bus routings including relocation of the transport vehicles/feeders buses. For Train 3, two buses were relocated, shown in dashed lines. One bus was relocated from Station 2 to Station 1, and one bus was relocated from Station 2 to Station 3.

As mentioned above, a key benefit of methods employed in accordance with aspects of the invention is the inclusion of individual passengers' Max DOC (Maximum Degree of Circuity), and their resultant maximum acceptable travel time. Unlike typical package delivery and pickup, passengers are likely to consider their travel times in the feeder bus in deciding whether or not to choose a carrier/transport service. Thus in methods carried out in accordance with aspects of the invention, each individual passenger's shortest direct travel time is calculated from the origin to the station (or to the destination from the station), and based on the administrator-designated Max DOC, their resulting maximum acceptable travel time in the feeder bus is established as a constraint for the SA algorithm. Those acceptable additional times are calculated and used as a ratio (travel time in the feeder bus/direct travel time to the origin or to the station).

The results of the foregoing research showed that when unit operating costs decline, total operating costs and total costs decline. Furthermore, when unit operating costs decline, the average passenger travel distance and total passenger travel costs decline while the ratio of total operating costs per unit operating costs increases. This means that if unit operating costs decrease, the portion of passenger travel costs in total costs increases, and the optimization process tends to reduce passenger costs more while reducing total costs. Assuming that automation of the vehicles reduces the operating costs, it will reduce total operating costs, total costs and total passenger travel costs as well. Those skilled in the art will recognize that the foregoing method can be extended beyond buses and trains to cover a broader transportation system.

Methods according to certain aspects of the invention may also include system optimizations that may show where best paths are possible. For instance, this method may also include system optimization based on a 100-point system that shows where best paths are possible. Further, systems and methods configured in accordance with aspects of the invention may optimize certain individuals among many, and may provide varying degrees of level of service, which may result in a slight loss of efficiency as a result of accommodating single passengers. Further, the methods described above may be applied to forms of delivery other than modes of transporting people, such as (by way of non-limiting example) for the movement of cargo and general logistics. With respect to the movement of cargo and/or materials, multiple modes for cargo transport may account for rail, water, planes, and trucks and cars, and one or more entities in a supply chain of such cargo may benefit through application of a system and method carried out in accordance with aspects of the invention.

Figure 7:
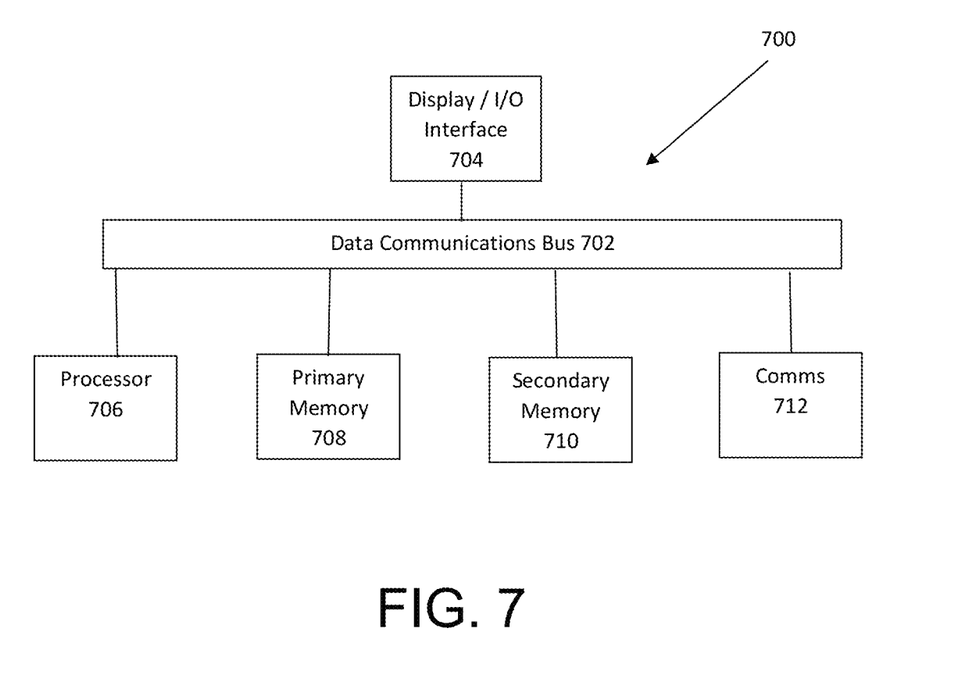
FIG. 7 shows a schematic view of an exemplary computer system suitable for implementing the methods described herein.

Next, FIG. 7 shows an exemplary computer system 700 suitable for implementing the methods described herein. Those skilled in the art will recognize that routing system 100 may take the form of computer system 700 as reflected in FIG. 7, though variations thereof may readily be implemented by persons skilled in the art as may be desirable for any particular installation. In each such case, one or more computer systems 700 may carry out the foregoing methods as computer code.

Computer system 700 includes a communications bus 702, or other communications infrastructure, which communicates data to other elements of computer system 700. For example, communications bus 702 may communicate data (e.g., text, graphics, video, other data) between bus 702 and an I/O interface 704, which may include a display, a data entry device such as a keyboard, touch screen, mouse, or the like, and any other peripheral devices capable of entering and/or viewing data as may be apparent to those skilled in the art. Further, computer system 700 includes a processor 706, which may comprise a special purpose or a general purpose digital signal processor. Still further, computer system 700 includes a primary memory 708, which may include by way of non-limiting example random access memory ("RAM"), read-only memory ("ROM"), one or more mass storage devices, or any combination of tangible, non-transitory memory. Still further, computer system 700 includes a secondary memory 710, which may comprise a hard disk, a removable data storage unit, or any combination of tangible, non-transitory memory. Finally, computer system 700 may include a communications interface 712, such as a modem, a network interface (e.g., an Ethernet card or cable), a communications port, a PCMCIA slot and card, a wired or wireless communications system (such as Wi-Fi, Bluetooth, Infrared, and the like), local area networks, wide area networks, intranets, and the like.

Each of primary memory 708, secondary memory 710, communications interface 712, and combinations of the foregoing may function as a computer usable storage medium or computer readable storage medium to store and/or access computer software including computer instructions. For example, computer programs or other instructions may be loaded into the computer system 700 such as through a removable data storage device (e.g., a floppy disk, ZIP disks, magnetic tape, portable flash drive, optical disk such as a CD, DVD, or Blu-ray disk, Micro Electro Mechanical Systems ("MEMS"), and the like). Thus, computer software including computer instructions may be transferred from, e.g., a removable storage or hard disc to secondary memory 710, or through data communication bus 702 to primary memory 708.

Communication interface 712 allows software, instructions and data to be transferred between the computer system 700 and external devices or external networks. Software, instructions, and/or data transferred by the communication interface 712 are typically in the form of signals that may be electronic, electromagnetic, optical or other signals capable of being sent and received by communication interface 712. Signals may be sent and received using a cable or wire, fiber optics, telephone line, cellular telephone connection, radio frequency ("RF") communication, wireless communication, or other communication channels as will occur to those of ordinary skill in the art.

Computer programs, when executed, allow the processor of computer system 700 to implement the methods discussed herein for the automated routing of transport vehicles, such as feeder buses and the like, according to computer software including instructions.

Computer system 700 may perform any one of, or any combination of, the steps of any of the methods described herein. It is also contemplated that the methods according to the present invention may be performed automatically, or may be accomplished by some form of manual intervention.

The computer system 700 of FIG. 7 is provided only for purposes of illustration, such that the invention is not limited to this specific embodiment. Persons having ordinary skill in the art are capable of programming and implementing the instant invention using any computer system.

Further, computer system 700 may, in certain implementations, comprise a handheld device and may include any small-sized computing device, including by way of non-limiting example a cellular telephone, a smartphone or other smart handheld computing device, a personal digital assistant, a laptop or notebook computer, a tablet computer, a hand held console, an MP3 player, or other similarly configured small-size, portable computing device as may occur to those skilled in the art.

The system of FIG. 1 may, in an exemplary configuration, be implemented in a cloud computing environment for carrying out the methods described herein. That cloud computing environment uses the resources from various networks as a collective virtual computer, where the services and applications can run independently from a particular computer or server configuration making hardware less important. The cloud computer environment includes at least one user computing device. The client computer may be any device that may be used to access a distributed computing environment to perform the methods disclosed herein, and may include (by way of non-limiting example) a desktop computer, a portable computer, a mobile phone, a personal digital assistant, a tablet computer, or any similarly configured computing device.

A client computer preferably includes memory such as RAM, ROM, one or more mass storage devices, or any combination of the foregoing. The memory functions as a computer readable storage medium to store and/or access computer software and/or instructions.

A client computer also preferably includes a communications interface, such as a modem, a network interface (e.g., an Ethernet card), a communications port, a PCMCIA slot and card, wired or wireless systems, and the like. The communications interface allows communication through transferred signals between the client computer and external devices including networks such as the Internet and a cloud data center. Communication may be implemented using wireless or wired capability, including (by way of non-limiting example) cable, fiber optics, telephone line, cellular telephone, radio waves or other communications channels as may occur to those skilled in the art.

Such client computer establishes communication with the one or more servers via, for example, the Internet, to in turn establish communication with one or more cloud data centers that implement routing system 100. A cloud data center may include one or more networks that are managed through a cloud management system. Each such network includes resource servers that permit access to a collection of computing resources and components of routing system 100, which computing resources and components can be invoked to instantiate a virtual computer, process, or other resource for a limited or defined duration. For example, one group of resource servers can host and serve an operating system or components thereof to deliver and instantiate a virtual computer. Another group of resource servers can accept requests to host computing cycles or processor time, to supply a defined level of processing power for a virtual computer. Another group of resource servers can host and serve applications to load on an instantiation of a virtual computer, such as an email client, a browser application, a messaging application, or other applications or software.

The cloud management system may comprise a dedicated or centralized server and/or other software, hardware, and network tools to communicate with one or more networks, such as the Internet or other public or private network, and their associated sets of resource servers. The cloud management system may be configured to query and identify the computing resources and components managed by the set of resource servers needed and available for use in the cloud data center. More particularly, the cloud management system may be configured to identify the hardware resources and components such as type and amount of processing power, type and amount of memory, type and amount of storage, type and amount of network bandwidth and the like, of the set of resource servers needed and available for use in the cloud data center. The cloud management system can also be configured to identify the software resources and components, such as type of operating system, application programs, etc., of the set of resource servers needed and available for use in the cloud data center.

In accordance with still further aspects of an embodiment of the invention, a computer program product may be provided to provide software to the cloud computing environment. Computer products store software on any computer useable medium, known now or in the future. Such software, when executed, may implement the methods according to certain embodiments of the invention. By way of non-limiting example, such computer usable mediums may include primary storage devices (e.g., any type of random access memory), secondary storage devices (e.g., hard drives, floppy disks, CD ROMS, ZIP disks, tapes, magnetic storage devices, optical storage devices, MEMS, nanotech storage devices, etc.), and communication mediums (e.g., wired and wireless communications networks, local area networks, wide area networks, intranets, etc.). Those skilled in the art will recognize that the embodiments described herein may be implemented using software, hardware, firmware, or combinations thereof.

The cloud computing environment described above is provided only for purposes of illustration and does not limit the invention to this specific embodiment. It will be appreciated that those skilled in the art are readily able to program and implement the invention using any computer system or network architecture.

Having now fully set forth the preferred embodiments and certain modifications of the concept underlying the present invention, various other embodiments as well as certain variations and modifications of the embodiments herein shown and described will obviously occur to those skilled in the art upon becoming familiar with said underlying concept. For example, while the exemplary case discussed above describes an analysis that is undertaken with respect to a single intersection, the system may readily be implemented to similarly adapt the ideal speed profile for a series of more than one signalized intersections, and continuously report the recommended speed to the user as discussed above. Similarly, the systems and methods described herein may be used in simulated driving environments for a wide variety of simulated road vehicles, including by way of non-limiting example in simulated cars, trucks, buses, and the like. It should be understood, therefore, that the invention may be practiced otherwise than as specifically set forth herein.

What is claimed is:

1. An automated method for routing transport vehicles from and to a plurality of primary transportation hubs, comprising:
   receiving, at a processor of a routing system computer, data from a plurality of intended transport vehicle passengers indicative of a current location and an intended destination of each said intended transport vehicle passenger;
   designating, at said processor, a plurality of constraints comprising a unique maximum degree of route circuitry for each said intended transport vehicle passenger;
   calculating, at said processor, a maximum travel time for each said intended transport vehicle passenger based on one of said constraints representing a corresponding unique maximum degree of route circuitry, wherein a corresponding maximum travel time for one of said intended transport vehicle passengers is calculated as said unique maximum degree of route circuitry for said one of said intended transport vehicle passengers multiplied by an actual, direct travel time for said one of said intended transport vehicle passengers between said current location and said intended destination of said one of said intended transport vehicle passengers;
   clustering, at said processor, subsets of said plurality of intended transport vehicle passengers according to said current location and said intended destination of each of said plurality of intended transport vehicle passengers;
   determining, at said processor, an optimal travel routing for each of a plurality of transport vehicles to transport each said intended transport vehicle passenger associated with one of said subsets between one of said plurality of primary transportation hubs associated with said one of said subsets and a final destination or starting point for each said intended transport vehicle passenger,
   wherein the determining of said optimal travel routing uses said maximum travel time for each said intended transport vehicle passenger; and
   transmitting, from said routing system computer, a routing signal to each said transport vehicle in said one of said subsets instructing each said transport vehicle in said one of said subsets to travel along a determined optimal travel routing for each said transport vehicle.

2. The automated method for routing transport vehicles of claim 1, wherein one of said current location and said intended location of each intended transport vehicle passenger further comprises one of said primary transportation hubs.

3. The automated method for routing transport vehicles of claim 1, wherein said step of using said maximum travel time for each said intended transport vehicle passenger as a constraint further comprises:
   iteratively evaluating, at said processor, proposed travel routes; and
   upon determining, at said processor, that a proposed travel route will incur a travel time for one of said intended transport vehicle passengers that exceeds said one of said intended transport vehicle passengers' maximum travel time, causing said processor to disregard said proposed travel route.

4. The automated method for routing transport vehicles of claim 3, further comprising the step of continuing to iteratively evaluate, at said processor, proposed travel routes until said optimal travel routing is generated, wherein said optimal travel routing (i) does not incur a travel time for any intended transport vehicle passenger that exceeds said any intended transport vehicle passenger's maximum travel time, and (ii) minimizes costs associated with said proposed travel routes.

5. The automated method for routing transport vehicles of claim 4, wherein said costs associated with said proposed travel routes further comprise transport vehicle operation costs and individual passenger travel time value costs.

6. The automated method for routing transport vehicles of claim 3, further comprising the steps of:
defining, at said processor, a transit network comprising said plurality of primary transportation hubs; and
upon determining, at said processor, that a number of transport vehicles associated with a first one of said primary transportation hubs is insufficient to transport all intended transport vehicle passengers associated with said first one of said primary transportation hubs to their destination, causing said routing signal to include an instruction to one or more transport vehicles associated with a second one of said primary transportation hubs in said transit network to collect and transport intended transport vehicle passengers associated with said first one of said primary transportation hubs.

7. A system for the automated routing of transport vehicles from and to a plurality of primary transportation hubs, said system comprising a memory and a processor in data communication with said memory, said memory having computer executable instructions stored thereon configured to be executed by said processor to cause said system to:
receive data from a plurality of intended transport vehicle passengers indicative of a current location and an intended destination of each said intended transport vehicle passenger;
designate a plurality of constraints comprising a unique maximum degree of route circuitry for each said intended transport vehicle passenger;
calculate a maximum travel time for each said intended transport vehicle passenger based on one of said constraints representing a corresponding unique maximum degree of route circuitry, wherein a corresponding maximum travel time for one of said intended transport vehicle passengers is calculated as said unique maximum degree of route circuitry for said one of said intended transport vehicle passengers multiplied by an actual, direct travel time for said one of said intended transport vehicle passengers between said current location and said intended destination of said one of said intended transport vehicle passengers;
cluster subsets of said plurality of intended transport vehicle passengers according to said current location and said intended destination of each of said plurality of intended transport vehicle passengers;
determine an optimal travel routing for each of a plurality of transport vehicles to transport each said intended transport vehicle passenger associated with one of said subsets between one of said plurality of primary transportation hubs associated with said one of said subsets and a final destination or starting point for each said intended transport vehicle passenger,
wherein the determining of said optimal travel routing uses said maximum travel time for each said intended transport vehicle passenger; and
transmit a routing signal to each said transport vehicle in said one of said subsets instructing each said transport vehicle in said one of said subsets to travel along a determined optimal travel routing for each said transport vehicle.

8. The system for automated routing of transport vehicles of claim 7, wherein one of said current location and said intended location of each intended transport vehicle passenger further comprises one of said primary transportation hubs.

9. The system for automated routing of transport vehicles of claim 7, wherein said computer executable instructions for using said maximum travel time for each said intended transport vehicle passenger as a constraint are further configured to:
iteratively evaluate proposed travel routes; and
upon determining that a proposed travel route will incur a travel time for one of said intended transport vehicle passengers that exceeds said one of said intended transport vehicle passengers' maximum travel time, cause said processor to disregard said proposed travel route.

10. The system for automated routing of transport vehicles of claim 9, wherein said computer executable instructions are further configured to continue to iteratively evaluate proposed travel routes until said optimal travel routing is generated, wherein said optimal travel routing (i) does not incur a travel time for any intended transport vehicle passenger that exceeds said any intended transport vehicle passenger's maximum travel time, and (ii) minimizes costs associated with said proposed travel routes.

11. The system for automated routing of transport vehicles of claim 10, wherein said costs associated with said proposed travel routes further comprise transport vehicle operation costs and individual passenger travel time value costs.

12. The system for automated routing of transport vehicles of claim 9, wherein said computer executable instructions are further configured to:
define a transit network comprising said plurality of primary transportation hubs; and
upon determining that a number of transport vehicles associated with a first one of said primary transportation hubs is insufficient to transport all intended transport vehicle passengers associated with said first one of said primary transportation hubs to their destination, cause said routing signal to include an instruction to one or more transport vehicles associated with a second one of said primary transportation hubs in said transit network to collect and transport intended transport vehicle passengers associated with said first one of said primary transportation hubs.

13. A non-transitory computer-readable medium having stored thereon one or more code sections each comprising a plurality of instructions executable by one or more processors, said instructions configured to cause the one or more processors to perform actions of an automated method for routing transport vehicles from and to a plurality of primary transportation hubs, said actions of said automated method comprising steps of:
receiving data from a plurality of intended transport vehicle passengers indicative of a current location and an intended destination of each said intended transport vehicle passenger;
designating a plurality of constraints comprising a unique maximum degree of route circuitry for each said intended transport vehicle passenger;
calculating a maximum travel time for each said intended transport vehicle passenger based on one of said constraints representing a corresponding unique maximum degree of route circuitry, wherein a corresponding maximum travel time for one of said intended transport vehicle passengers is calculated as said unique maximum degree of route circuitry for said one of said intended transport vehicle passengers multiplied by an actual, direct travel time for said one of said intended transport vehicle passengers between said current location and said intended destination of said one of said intended transport vehicle passengers;

clustering subsets of said plurality of intended transport vehicle passengers according to said current location and said intended destination of each of said plurality of intended transport vehicle passengers;

determining an optimal travel routing for each of a plurality of transport vehicles to transport each said intended transport vehicle passenger associated with one of said subsets between one of said plurality of primary transportation hubs associated with said one of said subsets and a final destination or starting point for each said intended transport vehicle passenger, wherein the determining of said optimal travel routing uses said maximum travel time for each said intended transport vehicle passenger; and transmitting a routing signal to each said transport vehicle in said one of said subsets instructing each said transport vehicle in said one of said subsets to travel along a determined optimal travel routing for each said transport vehicle.

14. The non-transitory computer-readable medium of claim 13, wherein one of said current location and said intended location of each intended transport vehicle passenger further comprises one of said primary transportation hubs.

15. The non-transitory computer-readable medium of claim 13, wherein said step of using said maximum travel time for each said intended transport vehicle passenger as a constraint further comprises:

iteratively evaluating proposed travel routes; and upon determining that a proposed travel route will incur a travel time for one of said intended transport vehicle passengers that exceeds said one of said intended transport vehicle passengers' maximum travel time, causing said processor to disregard said proposed travel route.

16. The non-transitory computer-readable medium of claim 15, the automated method further comprising the step of continuing to iteratively evaluate proposed travel routes until said optimal travel routing is generated, wherein said optimal travel routing (i) does not incur a travel time for any intended transport vehicle passenger that exceeds said any intended transport vehicle passenger's maximum travel time, and (ii) minimizes costs associated with said proposed travel routes.

17. The non-transitory computer-readable medium of claim 15, the automated method further comprising the steps of:

defining a transit network comprising said plurality of primary transportation hubs; and upon determining that a number of transport vehicles associated with a first one of said primary transportation hubs is insufficient to transport all intended transport vehicle passengers associated with said first one of said primary transportation hubs to their destination, causing said routing signal to include an instruction to one or more transport vehicles associated with a second one of said primary transportation hubs in said transit network to collect and transport intended transport vehicle passengers associated with said first one of said primary transportation hubs.

* * * * *